(No Model.)   7 Sheets—Sheet 1.

F. H. RICHARDS.
WEIGHING MACHINE.

No. 565,226.   Patented Aug. 4, 1896.

Fig.1.

Witnesses:
R. W. Pittman
Fred. J. Dole.

Inventor:
F. H. Richards.

(No Model.) 7 Sheets—Sheet 2.

F. H. RICHARDS.
WEIGHING MACHINE.

No. 565,226. Patented Aug. 4, 1896.

Fig. 2.

Witnesses:
R. W. Pittman
Fred. J. Dole.

Inventor:
F. H. Richards (No Model.)  F. H. RICHARDS.  7 Sheets—Sheet 3.
WEIGHING MACHINE.

No. 565,226.  Patented Aug. 4, 1896.

Fig.3.

Witnesses:
R. W. Pittman,
Fred. J. Dole.

Inventor
F. H. Richards (No Model.)  7 Sheets—Sheet 4.

F. H. RICHARDS.
WEIGHING MACHINE.

No. 565,226.  Patented Aug. 4, 1896.

Fig. 4.

Witnesses:
R. W. Pittman
Fred. J. Dole

Inventor:
F. H. Richards (No Model.) 7 Sheets—Sheet 5.

F. H. RICHARDS.
WEIGHING MACHINE.

No. 565,226. Patented Aug. 4, 1896.

Fig. 5.

Witnesses:
R. W. Pittman
Fred. J. Dole

Inventor:
F. H. Richards (No Model.) 7 Sheets—Sheet 6.

F. H. RICHARDS.
WEIGHING MACHINE.

No. 565,226. Patented Aug. 4, 1896.

Witnesses:
R. W. Pittman.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 565,226, dated August 4, 1896.

Application filed March 4, 1896. Serial No. 581,732. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved organization of coacting valve-closer and interlocking stop mechanisms, more especially applicable to weighing-machines of relatively large capacities.

In the drawings accompanying and forming part of this specification.

Similar characters designate like parts in all the figures of the drawings.

Figure 9:
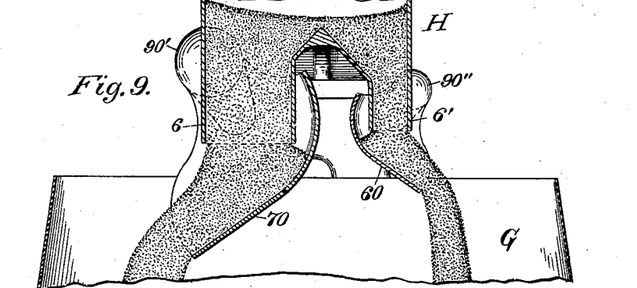
Figs. 9, 10, and 11 are central vertical sections of the supply-chute, the valves therefor, and the upper part of the bucket and illustrating the successive positions of the valves.
Figures 10, 11:
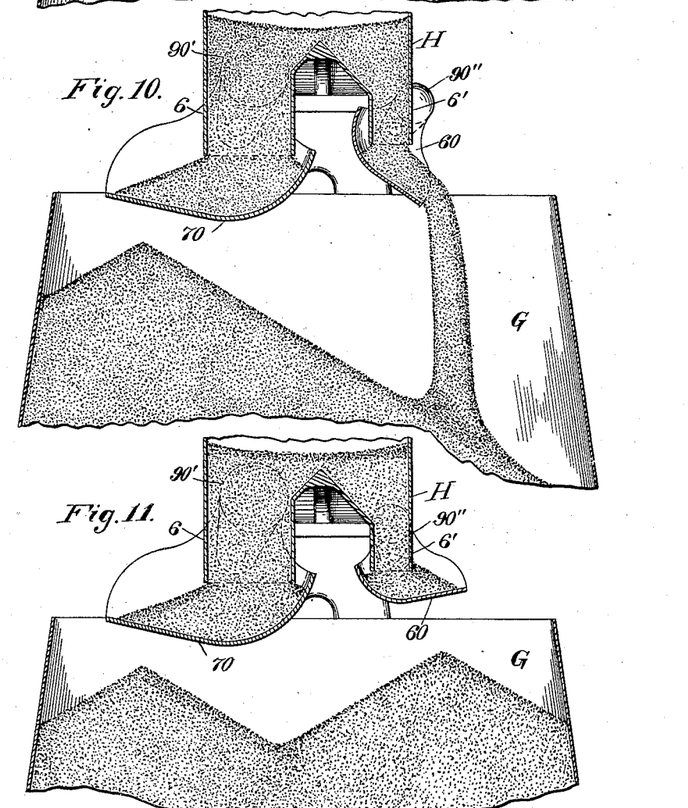

The framework for supporting the operative mechanisms of the machine is shown comprising the side frames or uprights 2 and 4, mounted upon the chambered supporting-base 3, and connected by the top plate or beam 5, which latter is shown carrying the supply chute or hopper H, comprising the separated chutes 6 and 6', Figs. 9, 10, and 11, for the supply of the main and the drip streams, respectively, to the bucket.

The base 3 is shown carrying the V-shaped bearings 20 and 20', constituting beam-supports for supporting the beam mechanism which carries the bucket mechanism, consisting of the bucket and its operative devices.

As a means for supporting the bucket, which is designated in a general way by G, a pair of oppositely-disposed counterweighted scale-beams are shown at B and B', respectively, pivotally mounted on the V-shaped bearings 20 and 20' by means of the pivots or knife-edges 24 and 24', and having bucket-supports located intermediate of said pivots or knife-edges, and herein shown as the pivots or knife-edges 15 and 15'.

The bucket G is shown carrying at each end thereof the hangers 555, provided with V-shaped bearings 16 and 16', which correspond in number and position with the pivots or knife-edges 15 and 15', and which are pivotally supported thereby. The bucket is shown having two discharge-outlets 8 and 8', separated by the inverted-Y-shaped wall or partition 9.

The bucket-closers, which are designated by L and L', respectively, close the discharge outlets or openings of the bucket, and are shown pivoted at 77 and 78, near the front and rear, respectively, of the bucket, and provided with the counterweighted arms 79 and 79', preferably formed integral therewith, for returning the same to their closed positions.

As a means for supporting the bucket-closers an inverted toggle mechanism will preferably be employed, which is shown comprising the rocker 550, pivotally carried on one end of the bucket, being illustrated as supported by the rock-shaft 553, which latter projects through the bucket, and the connecting-rods 596 and 596', which are pivotally connected with the rocker crank-arm 553' and to the bucket-closers L and L' in such a manner that when the closers are shut the pivots of the two connecting-rods 596 and 596' will be approximately in line with the rocker-pivot, and the pivots of the two rods will be above the rocker-pivot, so that when the rocker or toggle member 550 is engaged by a bucket-closer latch and held in that position the closers will be supported with a minimum pressure on said latch, as practically all of the weight of the bucket contents will be carried on the rocker-shaft 553. The latch for locking the rocker in position when the closer is shut is shown at 82, and pivoted at 87 on one end of the bucket, and having a detent or stop 81 in position for engaging a coöperating detent or stop 550″ on one end of the arm 550′, carried by the rocker 550, when the parts are in the closed position previously described. Suitable stops will also be provided for limiting the movement of said bucket-closer latch. In the embodiment illustrated the closer-latch swings upward to engage the rocker-arm 550, being counterweighted to the rear of its pivot for this purpose, and it will therefore be evident that said latch may be released from engagement with the rocker by a downward movement or pressure thereon.

As a means for controlling the main and the drip streams which flow from the main and the drip stream chutes 6 and 6′, respectively, the pair of valves illustrated at 70 and 60 will preferably be employed, the first mentioned of which constitutes the main valve and the other of which constitutes a supplemental valve, and which valves are each substantially similar in construction and mode of operation to the improved valve shown and described in Letters Patent No. 535,727, granted to me March 12, 1895, to which reference may be had.

The valve 70 is shown pivoted between the arms or brackets 5′, projecting from the top plate 5, and the supplemental valve 60 is shown similarly mounted, its supporting-brackets being designated by 5″. The valves employed are also shown located substantially beneath the mouths of the two chutes and extending beyond the edges thereof sufficiently far to support the descending column or stream of material when closed. These valves are also preferably balanced, so as to have, in themselves, normally, no tendency to either open or close, the balance-weights 90′ and 90″ being shown for this purpose. The two valves will have their closing movements in succession, whereby when the main valve has been closed the drip or supplemental valve will be held in an open position to permit the flow of an undiminished drip-stream into the bucket for the purpose of completing the load therein.

As a means for closing the valves I prefer to employ the valve-closing mechanism shown and described in Letters Patent No. 548,843, granted to me October 29, 1895, to which reference may be had, and which will now be described.

A valve-closing cam is shown at 500, having a cam-face 501 in position to be engaged by a suitable device for closing the valve.

A valve-closer lever is shown at 504, pivoted to the side frame 4, and having on its forward arm the adjustable counterweight 507, the rear arm of said lever being shown provided with the antifriction-roll 506, positioned for engaging the cam-face 501 of the cam 500, whereby the closure of the valve 70 may be effected on the descending movement of the counterweighted arm through the riding over the cam-face 501 of the cam 500 by said roll 506.

The valve-closing mechanism for the supplemental valve 60 is the same in construction and mode of operation as the main valve. The valve-closing cam is shown at 500′, its cam-face at 501′, and the closing-lever therefor at 504′, the cam-engaging roll being designated by 506′ and the counterweight by 507′.

The weighing-machine embodies the usual poising and counterpoising mechanisms. All that part of the beam mechanism located outside of the beam-supports constitutes the counterpoising mechanism, and all that part of the beam mechanism located intermediate said beam-supports, including the bucket mechanism, which is supported thereby for ascending and descending movements, constitutes the poising mechanism.

For effecting an opening movement of one of the stream-controlling valves, herein illustrated as the main valve 70, I prefer to employ a two-stroke shiftable member operative on one of said strokes for opening said valve, the peculiar function of which will now be described.

The main valve 70 is illustrated carrying at a point to the rear of the pivot thereof the depending connecting-rod 558, which is preferably pivoted thereto. The scale-beam B is illustrated carrying the counterpoise or shiftable lever 551, pivoted thereto at 551′, and which normally forms a part of the counterpoising mechanism, (see Figs. 1 and 2,) but which is shiftable on the poising mechanism at a predetermined point in the operation of the machine. On the return movement of said shiftable lever to its normal position the effective end 551″ thereof is operable for engaging the lower end of the connecting-rod 558 to impart an upward thrust thereto for opening the main valve 70. For maintaining the shiftable lever 551 in its normal position the stop 552 on the scale-beam B, engaging a coöperating-stop 552′ on said lever 551, is preferably employed. For effecting the opening movement of the supplemental valve 60, said valve is illustrated provided with the cam 30, which is in position to be engaged by an actuator operative with the main valve 70, so that the supplemental valve may be opened by and on the opening movement of the main valve and through the power of the latter.

The main valve 70 is shown provided with the rigid rearwardly-extending arm 31, constituting an actuator for opening the supplemental valve 60, said arm being shown bifurcated at 31′ to receive an antifriction-roll 31″. On the opening movement of the main valve the arm 31 will of course be carried therewith, the antifriction-roll 31″ thereof engaging the cam-face 30′ of the valve-opening cam 30 at a point adjacent to the supplemental valve on the initial opening movement of said main valve 70, and riding over said cam-face on the continued opening movement of the main valve, said supplemental valve will be swung about its pivot and opened.

Each of the valves carries a stop member, the closer being also equipped with a coöperating stop member, the effective periods of which are reciprocal, the valve-operative stop members maintaining the bucket-closer or bucket-closers shut, should the closer-latch 82 be released while either of the valves is open, and the closer-operative stop member maintaining both valves closed during the bucket-discharging period, or while the bucket-closers are open.

The stop member for the main valve is designated by 412, and the stop member for the supplemental valve is designated by 413, the rocker 550 being shown as constituting the closer-operative stop member.

The main stop-valve member 412 is shown provided with the stops 412' and 412", (illustrated, respectively, as an outwardly-projecting segmental flange and as an antifriction-roll,) and the stop member 413 is illustrated provided with similar stops 413' and 413", respectively, the segmental flange 413', however, projecting inward. The closer-operative stop member 550 is also shown provided with two stops or segmental flanges projecting from the opposite faces, and designated, respectively, by 414 and 414'. The stop 414, during the closing movement of the main valve 70, coacts with the stop 412', with which it approximately runs in contact during the closing movement of said valve, so that any tendency of the stop member 550 to rock about its pivot, should the latch 82 be prematurely released, will be positively prevented by the stop 412', against which stop 414 impinges, the stop member 412 serving practically as a fixed abutment. When, however, the periphery of the antifriction roll or stop 412" has passed below the plane of curvature of the inner face of the stop 414, the member 550 is free to oscillate, so far as the stop member 412 is concerned. Additional stops are provided for preventing the opening movement of the closer, while the supplemental valve 60 is open and the drip-stream is flowing into the bucket.

The stop 414' is illustrated as peripherally longer than the opposite stop 414, and it is effective—succeeding the closure of the main valve and the cut-off of the main stream—for preventing the opening movement of the bucket-closers, these two stops running approximately in contact. When, however, the roll 413" has passed below the plane of curvature of the stop 414', the closers L and L' may be opened, and, provided the latch 82 has been depressed, the weight of the bucket contents will force said closers open for discharging the bucket-load.

Figures 7, 8, 12:
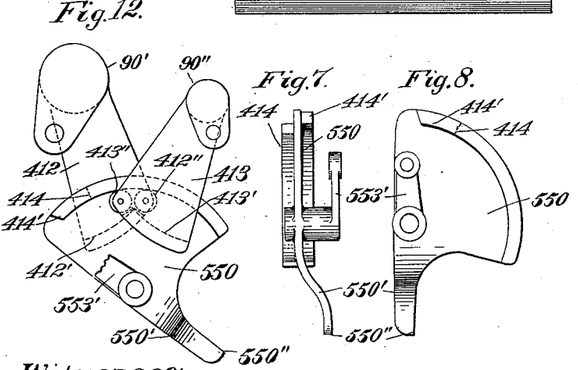
Figs. 7 and 8 are detail views of a closer-operative stop member.
Fig. 12 is a detail view of the interlocking stops.

When the two valves 70 and 60 have cut off their respective streams of material, it will be evident that the stops or antifriction-rolls 412" and 413" will have passed below the plane of curvature of the lower faces of the two segmental stops 414 and 414', (shown in Fig. 12,) so that the latch 82, having been depressed, the bucket-closers L and L' may be forced open.

On the opening movement of the bucket-closers L and L', the stop member 550 is oscillated about its pivot, through the medium of connecting-rods or toggle members 596 and 596'. As the stop member 550 thus oscillates, the stops 414 and 414' ride over or in contact with the stops or antifriction-rolls 412" and 413", so that the opening movement of the two valves will be effectually resisted by the two stops 414 and 414', against which the two stops 412" and 413" abut, this peculiar relation continuing while the bucket-closers L and L' are open. When these last-mentioned stops have passed out of contact, the bucket-closers L and L' being then closed, it will be obvious that the two valves 70 and 60 may be opened in the manner previously described.

The valve 60 will be normally maintained in an open position, and for this purpose I prefer to employ the stop shown, which is in the nature of a by-pass. Such stop is illustrated at 570 as a counterweighted lever, pivotally supported by the side frame 4. The supplemental valve 60 is illustrated as provided with a depending stop-arm 569, which is in position to be engaged by the by-pass stop 570 on the full opening movement of said valve. As the supplemental valve 60 is opened, the stop-arm 569 will be carried therewith, and into engagement with the forward arm 570' of the by-pass lever 570, slightly depressing said arm, and when the stop-arm 569 has passed beyond said forward arm 570' of the by-pass lever 570, said arm 570' will be thrust upward through the medium of the counterweight of said by-pass, the by-pass being then in position to prevent the closing movement of the supplemental valve 60 by engaging the arm 569.

As a means for depressing the by-pass to release the supplemental valve 60, whereby the same may be closed, I prefer to employ an actuator operatively connected with the beam mechanism, herein illustrated as connected with the scale-beam B.

Figure 4:
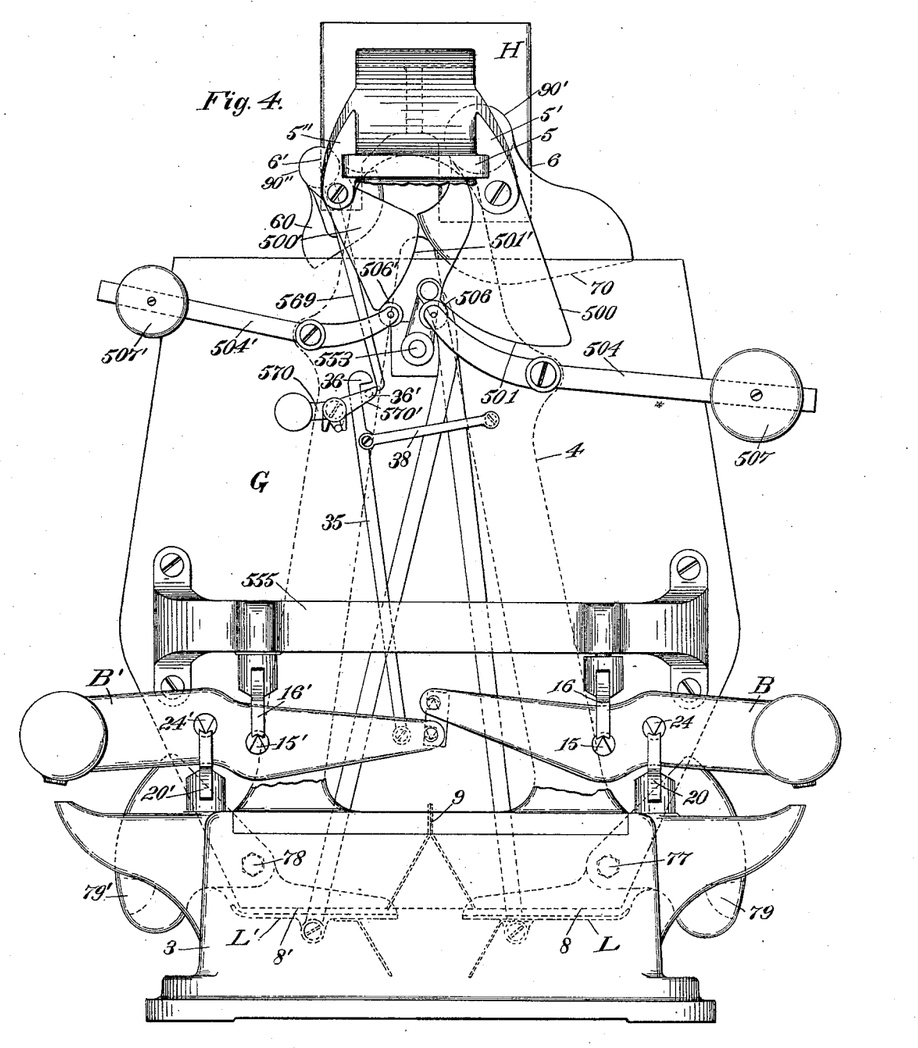
Fig. 4 is an opposite end elevation of the machine, the valves being in a position corresponding with Fig. 2.
Figure 5:
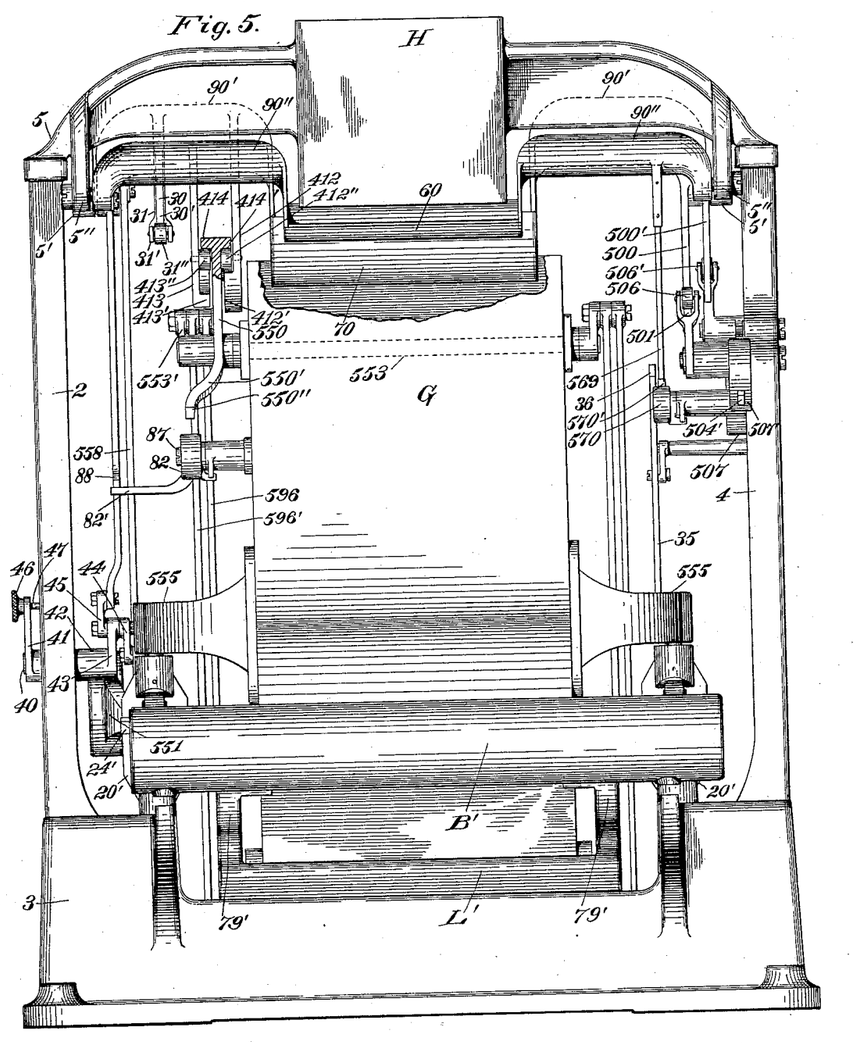
Fig. 5 is a rear elevation of the machine.
Figure 6:
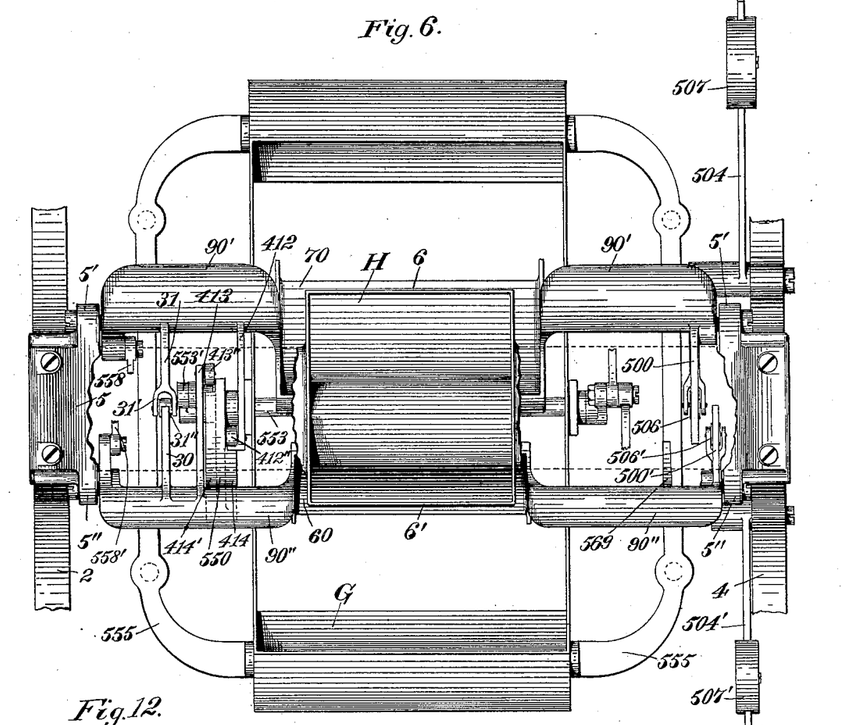
Fig. 6 is a plan view of the principal parts of the machine.

The scale-beam B is illustrated provided, at a point adjacent to the inner end thereof, with the upwardly-extending arm or rod 35, (see Fig. 4,) which is shown provided at its upper end with the hook or bent-over portion 36, constituting an actuator for the by-pass 570, and in position for engaging a pin 36', laterally projecting from the forward arm of the by-pass stop 570, so that when the scale-beam B has reached and passed below the poising-line, the by-pass 570 will be depressed, and the stop-arm 569, and hence the supplemental valve 60 released, whereby the supplemental-valve-closing lever 504' is effective for closing the supplemental valve for cutting off the drip-stream. Means are also provided for maintaining the by-pass actuator 36 in an operative position, said means being herein illustrated as a guide in the form of a link 38, (shown pivotally connected with the rod 35, and with the framework of the machine.)

It will be remembered that a latch 82 is described as normally maintaining the bucket-closers L and L' shut by engaging the rocker 550 when said closers are shut, and that when said latch is depressed the two bucket-closers are released for discharging the bucket-load. For thus depressing the latch I prefer to employ a latch actuator or releaser device operative with the supplemental valve 60 for depressing said latch through the power of said valve.

The supplemental valve is illustrated provided with the downwardly-extending rod 558', connected to said valve at a point to the rear of the pivot thereof, and provided, at a suitable point thereon, with the latch actuator or releaser device 88, which has a descending movement, on the release of the supplemental valve in the manner previously described, into engagement with a coöperating pin or stop 82', formed on the latch 82, so that during the final closing movement of the supplemental valve, and subsequent to the cut off of the drip-stream thereby, the latch 82 will be depressed through the valve-operated actuator 88, when, the bucket-closers being free of all restraint, said closers will be forced open by the weight of the bucket contents pressing thereagainst.

It is desirable at given periods to make tests to ascertain the accuracy of work performed by a weighing-machine; and the machine illustrated is equipped with means for this purpose which will now be described.

The side frame 2 is illustrated carrying the rock-shaft 40, the outer end of which is shown provided with the crank-arm 41 and the inner end thereof with the hub 42, provided with the rock-arm 43, to which the connecting-links 44 and 45 are shown pivotally connected on opposite sides thereof, the opposite ends of said links being also shown respectively connected with the two connecting-rods 558 and 558'. The crank-arm 41 is shown having the thumb-piece 46, in which is located a spring-pin 47 for engaging in either one of the openings 48 and 49, formed in the side frame 2. During the normal position of the machine the spring-pin 47 will be seated in the opening 48 in the side frame, whereby, through the connection therewith, the two connecting-rods 558 and 558' will be maintained in the normal positions thereof. The test is made during the poising period, (see Fig. 2,) or when the main valve is closed, and is made in the following manner: The thumb-piece 46 is grasped and the spring-pin 47 therein withdrawn from the opening 48 in the side frame. The crank-arm 41 is then turned to the left, the connecting-links 44 and 45 will move in a coinciding direction, and the two rods 558 and 558' will be swung thereby from their normal positions—the connecting-rod 558 out of operative relation with the lever 551 and the actuator 88 away from its normal plane of movement—so that on the continued descending movement of said actuator 88, during the final closing movement of the supplemental valve 60, the latch will not be depressed for releasing the bucket-closers L and L'. If a correct load be in the loaded bucket, the latter will assume a true poised position on the poising line.

Figure 1:
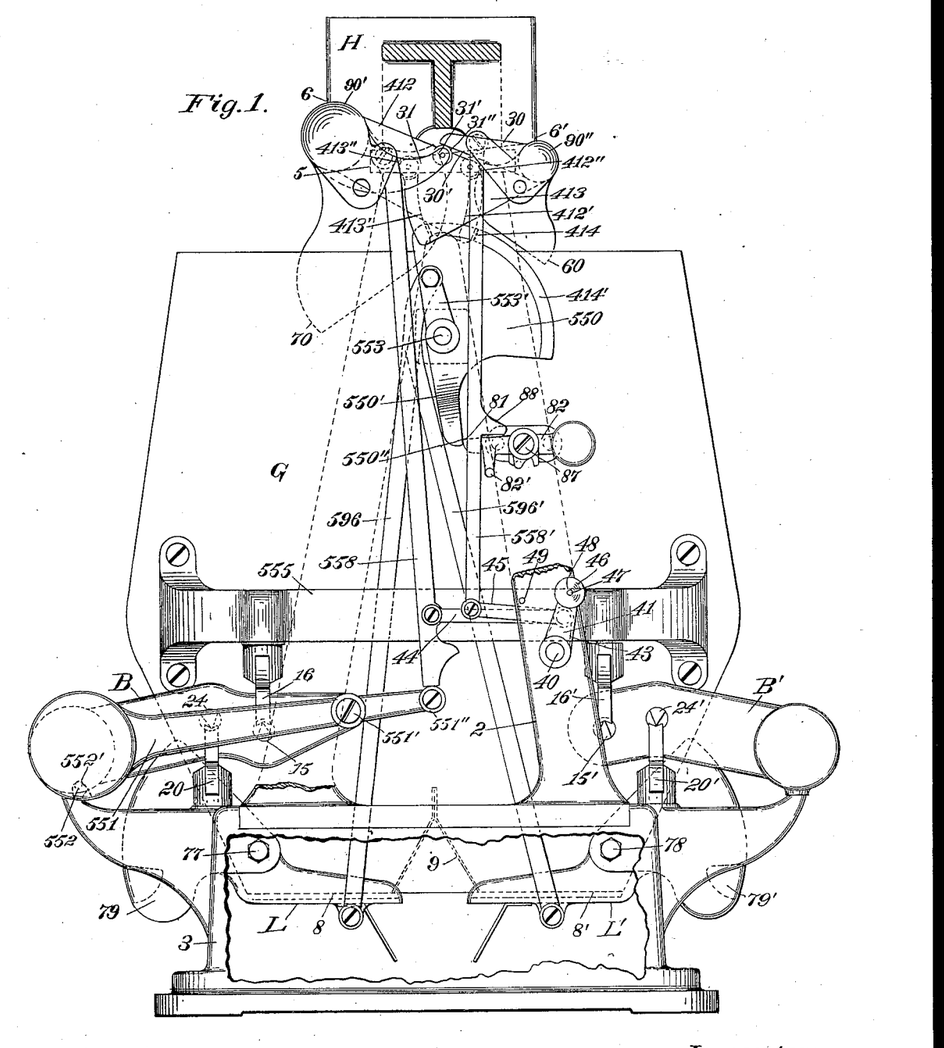
Figure 1 is a left-hand end elevation of a weighing-machine embodying my improvements, both valves being open and the bucket-closers shut.
Figure 2:
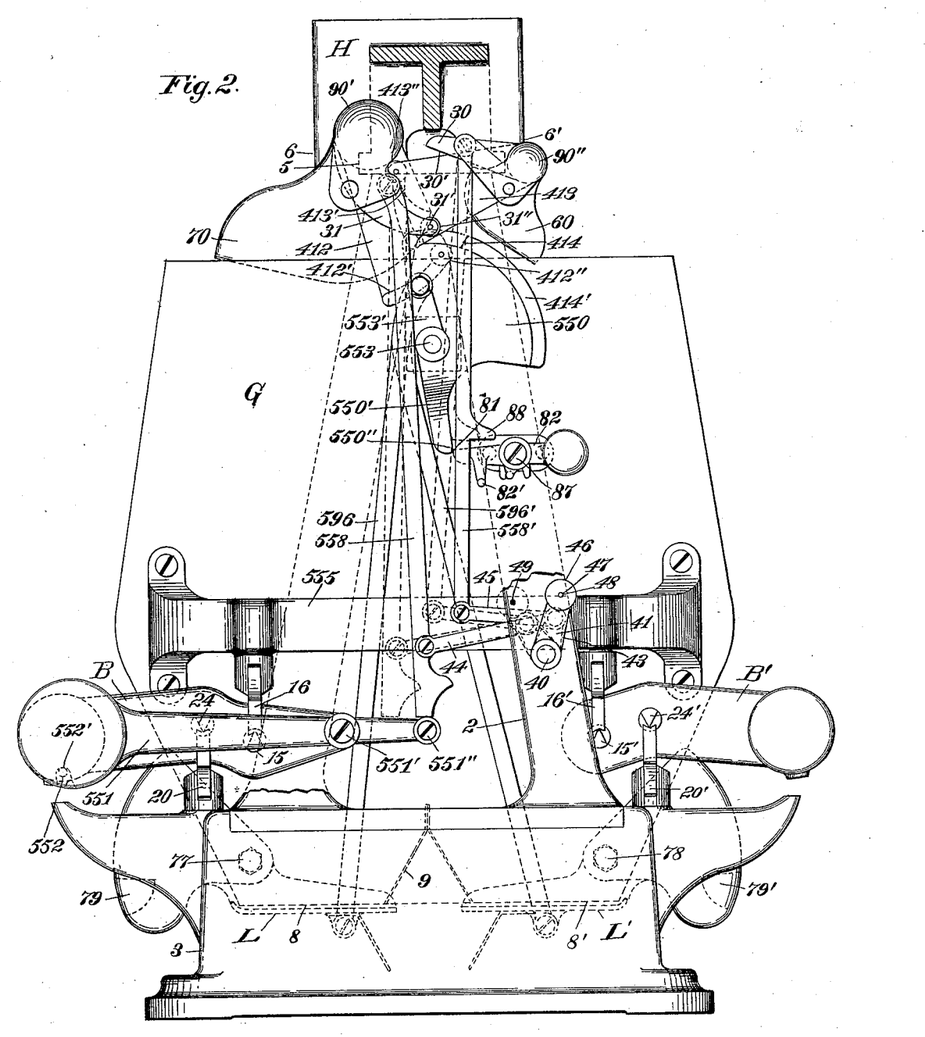
Fig. 2 is a similar view, the main valve having been closed.
Figure 3:
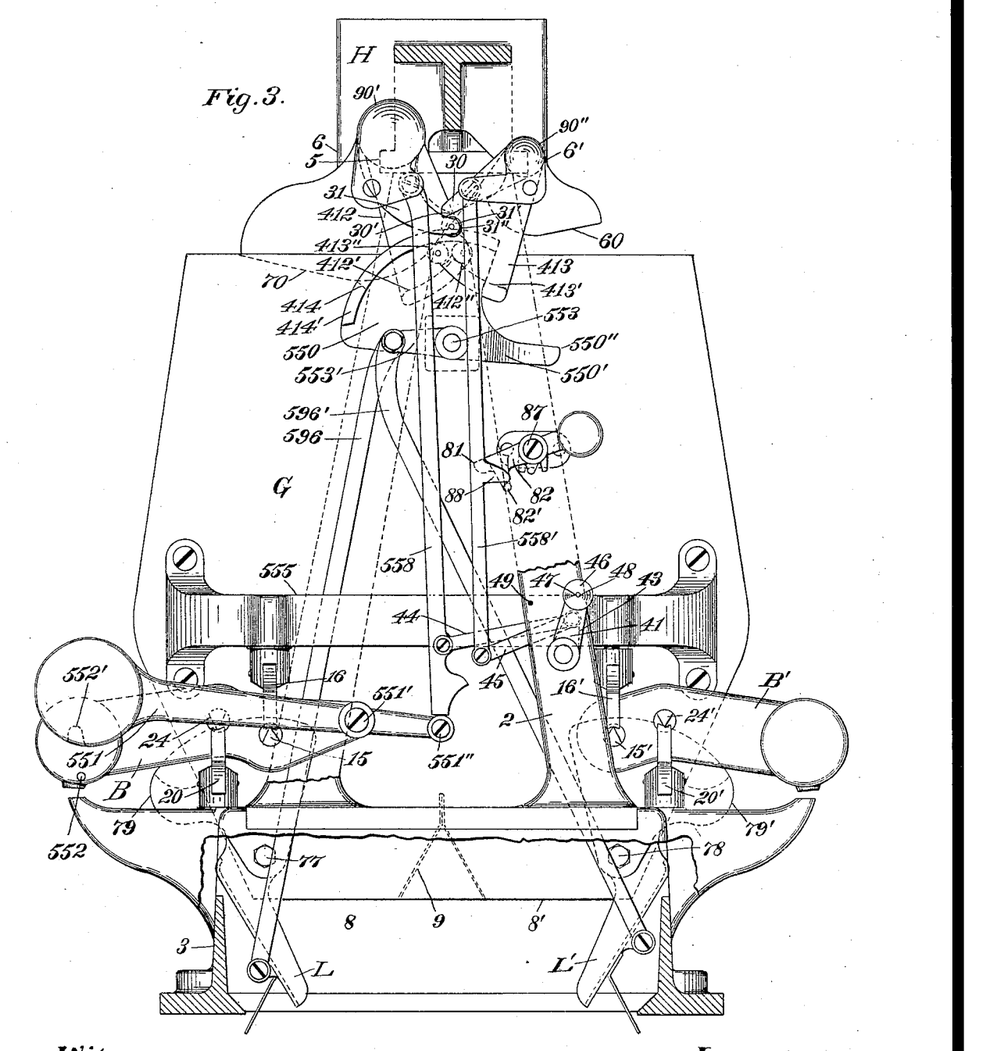
Fig. 3 is a similar view illustrating a succeeding step in the operation of the machine, both valves being closed and the bucket-closers open for discharging the bucket-load.

The operation of the hereinbefore-described weighing-machine, briefly, is as follows: Fig. 1 represents the normal positions of the operative mechanism at the commencement of operation of the machine, both valves being open and the supplemental valve 60 held in its open position through the engagement of the by-pass stop 570 with the depending stop-arm 569 of the supplemental valve. (See Fig. 4.) The chute H being supplied with material, the latter will gravitate from the two chutes 6 and 6', respectively, thereof, and onto the two valves 60 and 70, the said valves directing the two streams of material in opposite directions. When a certain portion of the mass has been received by the bucket, the bucket, and hence the poising side of the beam mechanism, will descend, the counterweighted lever 551 moving therewith, and thereby falling from under the connecting-rod 558, to permit the closing movement of the main valve 70 by the valve-closing lever 504, the antifriction-roll 506 of which rides along the cam-face 501 of the valve-closing cam 500, so that when said roll 506 has reached the inner end of the cam-face 501 the valve 70 will be closed. (See Figs. 2 and 4.) Said figures illustrate the positions of the mechanisms at the commencement of the poising period, and the supplemental valve 60 will still be in its open position to permit the drip-stream to flow into the bucket. As the drip-stream flows into the bucket, the latter will slowly descend, and when the scale-beam B' has passed below the poising-line, the actuator 36 will be pulled downward by said scale-beam and into contact with the stop-pin 36', depressing the by-pass latch 570 and releasing the stop-arm 569, and hence the supplemental valve 60, whereby the valve-closing lever 504' is instantly effective for closing the supplemental valve 60. During this final closing movement of the supplemental valve 60 the actuator 88 will be thrust downward, and at a point succeeding the cut-off of the drip-stream the stop-pin 82' of the latch 82 will be engaged by said actuator 88 and said latch depressed, so that the bucket-closers L and L', being thus released, may be opened for discharging the completed bucket-load.

Having thus described my invention, I claim—

1. In a weighing-machine, the combination with a chute; of a pair of valves, one of which carries a cam, and the other of which carries a rigid cam-actuator; a depending member carried by one of said valves; and a shiftable two-stroke member operative for engaging said depending member.

2. In a weighing-machine, the combination with a bucket having a closer; of a latch normally operative for holding said closer against opening movement; a pair of valves; a connecting-rod carried by each of said valves, one of which is provided with a latch-actuator; and a shiftable two-stroke member operative for engaging the other rod on one of the strokes thereof.

3. In a weighing-machine, the combination with a bucket having a closer; of a latch normally operative for holding said closer against opening movement; a pair of valves; a connecting-rod carried by each of said valves, one of which is provided with a latch-actuator; a shiftable two-stroke member operative for engaging the other rod on one of the strokes thereof; and means for shifting said connecting-rods from the normal positions thereof.

4. In a weighing-machine, the combination with a chute; of a pair of successively-closing valves therefor, each having a stop; a bucket having a closer; and a stop member operative with the closer and having a pair of oppositely-projecting stops operable for engaging the first-mentioned stops on the opening movement of the closer, to thereby hold said valves closed.

5. In a weighing-machine, the combination with a chute; of a pair of successively-closing valves therefor, each having a stop; a bucket having a closer; and a stop member operative with the closer, having a pair of oppositely-projecting segmental flanges operable for engaging the valve-stops on the opening movement of the closer, to thereby hold the valves closed.

6. In a weighing-machine, the combination with a chute; of a pair of valves therefor; valve-actuating mechanism; a bucket and its supporting-beam mechanism; a depending arm operative with one of said valves; a movably-supported stop operative for engaging said arm at a predetermined point in the closing movement of the valve; and an actuator for said stop operatively connected with the beam mechanism.

7. In a weighing-machine, the combination with a chute; of a pair of valves therefor; valve-actuating mechanism; a bucket and its supporting-beam mechanism; a depending arm operative with one of said valves; a movably-supported stop operative for engaging said arm at a predetermined point in the closing movement of the valve; an actuator for said stop; and a guide for said actuator.

8. In a weighing-machine, the combination with beam mechanism embodying a scale-beam, and with a chute; of a pair of valves for said chute; a depending arm carried by one of said valves; a by-pass stop operative for engaging said arm at a predetermined point in the closing movement of the valve; and an upwardly-extending hooked rod carried by said scale-beam and operative for engaging and depressing said by-pass stop.

FRANCIS H. RICHARDS.

Witnesses:
   FRED. J. DOLE,
   HENRY BISSELL.